United States Patent
Fujisawa et al.

(10) Patent No.: US 7,501,474 B2
(45) Date of Patent: Mar. 10, 2009

(54) POLYPHENYLENE ETHER RESIN COMPOSITION

(75) Inventors: Takeshi Fujisawa, Kanagawa (JP); Matsuyoshi Nakagawa, Chiba (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 144 days.

(21) Appl. No.: 10/521,733

(22) PCT Filed: Jul. 18, 2003

(86) PCT No.: PCT/JP03/09184

§ 371 (c)(1), (2), (4) Date: Sep. 8, 2005

(87) PCT Pub. No.: WO2004/009701

PCT Pub. Date: Jan. 29, 2004

(65) Prior Publication Data

US 2006/0106165 A1 May 18, 2006

(30) Foreign Application Priority Data

Jul. 22, 2002 (JP) .............................. 2002-212571

(51) Int. Cl.
*C08L 71/12* (2006.01)
*C08L 53/02* (2006.01)

(52) U.S. Cl. .................... 525/68; 525/89; 525/92 D

(58) Field of Classification Search .................. None
See application file for complete search history.

(56) References Cited

U.S. PATENT DOCUMENTS 6,451,964 B1 * 9/2002 Hakamaya et al. .......... 528/480

2002/0035206 A1 * 3/2002 Kurasawa et al. ........... 525/132

FOREIGN PATENT DOCUMENTS

| EP | 1148097 A1 | 10/2001 |
|---|---|---|
| JP | 2-11047 | 4/1990 |
| JP | 06234911 | 8/1994 |
| JP | 2797001 | 7/1998 |
| JP | 10330610 | 12/1998 |
| JP | 1108535 * | 3/1999 |
| JP | 2001-207001 | 7/2001 |
| JP | 2003-253066 | 9/2003 |

OTHER PUBLICATIONS

Kroschwitz, Concise Encyclopedia of Polymer Science and Engineering, 1990; p. 870.*

* cited by examiner

*Primary Examiner*—David Buttner
(74) *Attorney, Agent, or Firm*—Staas & Halsey LLP

(57) ABSTRACT

A resin composition comprising (A) 70 to 98% by weight of a polyphenylene ether resin or a mixture of a polyphenylene ether resin and a polystyrene-based resin, (B) 1 to 15% by weight of a hydrogenated product of an aromatic vinyl-conjugate diene block copolymer having an aromatic vinyl content of 50 to 80% by weight, and (C) 1 to 15% by weight of a hydrogenated product of an aromatic vinyl-isoprene block copolymer having an aromatic vinyl content of 15 to 45% by weight is excellent in injection moldability (fluidability and productivity), heat resistance, impact resistance and chemical resistance, can provide a molded article excellent in appearance and rigidity even in a thin-walled portion, and can be suitably used for applications in which the molded article is used in contact with water or under conditions of high temperature and high humidity, particularly in a portion which comes into contact with an organic solvent contained in skin lotion or the like.

18 Claims, No Drawings

POLYPHENYLENE ETHER RESIN COMPOSITION

This application is based on and hereby claims priority under 35 U.S.C. §371 to PCT Application No. PCT/JP2003/09184 filed on Jul. 18, 2003 and Japanese Application No. 2002-212571 filed on Jul. 22, 2002, the contents of which are hereby incorporated by reference.

TECHNICAL FIELD

The present invention relates to a resin composition excellent in chemical resistance, heat resistance, rigidity and impact resistance, and suitable for a commercial product to be used in contact with water or under conditions of high temperature and high humidity, particularly suitable for a portion which comes into contact with an organic solvent contained in skin lotion or the like. The invention also relates to a molded article obtained therefrom which is excellent in appearance.

BACKGROUND ART

Polyphenylene ether (hereinafter sometimes abbreviated as PPE) has been utilized for various applications because of its characteristics, i.e., heat resistance and water resistance of that resin and good compatibility with a styrenic resin. In particular, it has been widely used in commercial products requiring both water resistance and heat resistance, such as toilet articles and parts around a bath (for example, a washing toilet table, a sink and a housing of a disposable razor). However, in the environment in which these parts are used, the possibility of contacting with, for example, tonic liquid represented by skin lotion, cream or the like is very high. An organic acid ester much contained therein, for example, an alkyl palmitate, a monofatty acid glyceride, a difatty acid glyceride or an alkyl phthalate, strongly acts on a resin composition having an aromatic ring. Accordingly, it becomes necessary to contrive to improve chemical resistance. Further, as the toilet articles, there are present not only large-sized products, but also many small-sized ones, so that injection moldability (flowability) and moldability relating thereto are also required.

As a procedure for improving chemical resistance of the PPE resin composition, there has been known a method of mixing polyethylene (low density and high density polyethylenes), polypropylene or the like abounding in organic solvent resistance together with a hydrogenated type 3 or type 2 aromatic vinyl-conjugate diene block copolymer (HTR), as described in patent documents 1 to 4. In order to sufficiently exhibit the effect of chemical resistance, it is necessary that substances such as polyethylene abounding in chemical resistance are added in an amount of 10% by weight or more. However, these have no compatibility with PPE, and techniques using the HTR for giving compatibility are introduced in patent documents 1 to 5. However, when high shear stress is applied at the time of injection molding, layer separation (so-called lamellar separation) occurs in a molded article. This phenomenon is particularly remarkable in a molded article small in size in which a site having a thickness of 2 mm or less is present, and especially remarkable in a site having a thickness of 0.5 mm or less. This separation phenomenon significantly lowers the strength of the molded article, and concurrently deteriorates chemical resistance. In particular, no effect is achieved at all for a solvent containing an organic acid ester such as a palmitic acid ester derivative or coconut oil contained in the skin lotion or the like as described above.

Techniques of blending an aromatic vinyl-isoprene block copolymer with polyphenylene ether are disclosed in patent documents 5 to 11. In patent documents 5 and 6, it is disclosed that moldability is improved without deteriorating heat resistance, and the effect of inhibiting vibration (vibration damping effect) is disclosed in patent documents 7 to 11. However, these patent documents are silent on chemical resistance, and chemical resistance to the above-mentioned organic acid ester-containing solvent has not been obtained.

Patent Document 1: JP 2-110147 A
Patent Document 2: U.S. Pat. No. 4,242,263
Patent Document 3: Japanese Patent No. 2,797,001
Patent Document 4: Japanese Patent No. 2,797,015
Patent Document 5: JP 7-304908 A
Patent Document 6: European Patent 789,058
Patent Document 7: JP 11-12457 A
Patent Document 8: JP 11-80535 A
Patent Document 9: JP 11-140298 A
Patent Document 10: JP 2001-139798 A
Patent Document 11: JP 2003-55528 A

DISCLOSURE OF THE INVENTION

An object of the invention is to provide a resin composition which improves injection moldability (fluidability and productivity), does not become brittle even when a molded article having a thin-walled portion is formed by injection molding, is good in the surface appearance of the resulting molded article, and is excellent in heat resistance, impact resistance and chemical resistance.

The present inventors have found out that layer separation at the time of injection molding is inhibited and the surface appearance of the resulting molded article is surprisingly improved by mixing two kinds of block copolymers different in aromatic vinyl content, and that chemical resistance can be markedly improved, thus reaching the invention.

That is to say, the invention provides:

1. A resin composition comprising (A) 70 to 98% by weight of a polyphenylene ether resin or a mixture of a polyphenylene ether resin and a polystyrene-based resin, (B) 1 to 15% by weight of a hydrogenated product of an aromatic vinyl-conjugate diene block copolymer having an aromatic vinyl content of 50 to 80% by weight, and (C) 1 to 15% by weight of a hydrogenated product of an aromatic vinyl-isoprene block copolymer having an aromatic vinyl content of 15 to 45% by weight;

2. The resin composition described in the above 1, wherein the polyphenylene ether resin has a weight-average molecular weight of from 8,000 to 80,000, and a molecular weight distribution of from 2.0 to 3.0;

3. The resin composition described in the above 1, wherein component (A) is a mixture of a polyphenylene ether resin and a polystyrene-based resin;

4. The resin composition described in the above 3, wherein the polystyrene-based resin is a resin comprising a conjugate diene polymer or a conjugate diene-aromatic vinyl block copolymer, having grafted thereto an aromatic vinyl chain, wherein the content of the conjugate diene is from 1 to 20% by weight, and the average dispersed particle size is from 0.5 to 3.0 micrometers;

5. The resin composition described in the above 4, wherein the conjugate diene has a 1,4-bond amount of 90% or more;

6. The resin composition described in the above 3, wherein the polystyrene-based resin has a weight-average molecular weight of from 170,000 to 400,000, and a molecular weight distribution of from 1.5 to 3.5;

7. The resin composition described in the above 1, wherein the aromatic vinyl-conjugate diene block copolymer (B) has a hydrogenation degree of 20% or more;

8. The resin composition described in the above 1, wherein the aromatic vinyl-conjugate diene block copolymer (B) has a hydrogenation degree of 50% or more;

9. The resin composition described in the above 1, wherein the aromatic vinyl-isoprene block copolymer (C) has a hydrogenation degree of 80% or more;

10. The resin composition described in the above 1, wherein isoprene blocks in the aromatic vinyl-isoprene block copolymer (C) have a total amount of 1,2- and 3,4-vinyl bonds of 35% or more;

11. The resin composition described in the above 1, wherein isoprene blocks in the aromatic vinyl-isoprene block copolymer (C) have a total amount of 1,2- and 3,4-vinyl bonds of 45% or more;

12. The resin composition described in the above 1, wherein isoprene blocks in the aromatic vinyl-isoprene block copolymer (C) have a total amount of 1,2- and 3,4-vinyl bonds of 50% or more;

13. A resin composition comprising 100 parts by weight of the resin composition described in any one of the above 1 to 12 and (D) 0.1 to 5 parts by weight of an α-olefinic copolymer;

14. A resin composition comprising 100 parts by weight of the resin composition described in any one of the above 1 to 13 and (E) 5 to 25 parts by weight of a polyolefin resin;

15. The resin composition described in any one of the above 1 to 14, further comprising a heat stabilizer or a coloring pigment;

16. A molded article comprising the resin composition described in any one of the above 1 to 15 and having a site with a thickness of 2 mm or less; and 17. The molded article described in the above 16, which is to be used for a site which comes into contact with an organic acid ester.

BEST MODE FOR CARRYING OUT THE INVENTION

The polyphenylene ether of the invention is a homopolymer and/or a copolymer which comprise bonding units represented by the following formula (1):

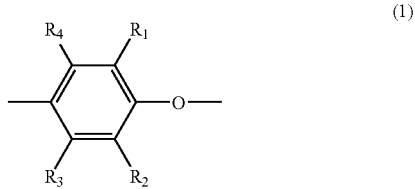

wherein $R_1$, $R_2$, $R_3$ and $R_4$, which may be the same or different, each is one-selected from the group consisting of hydrogen, a halogen, a hydrocarbon and a substituted hydrocarbon group.

The reduced viscosity (measured at 30° C. at a concentration of 0.5 g/dl $CHCl_3$) of the polyphenylene ether is preferably from 0.15 to 0.70, and more preferably from 0.20 to 0.60. Further, the weight average molecular weight is preferably from 8,000 to 80,000, and the molecular weight distribution (the ratio of weight average molecular weight/number average molecular weight) is preferably from 2.0 to 3.0.

Specific examples thereof include poly(2,6-dimethyl-1,4-phenylene ether) and a copolymer of 2,6-dimethyl-1,4-phenylene ether, 2,3,6-trimethylphenol and the like. Above all, poly(2,6-dimethyl-1,4-phenylene ether) is preferred.

A method for producing such polyphenylene ether is not particularly limited, as long as it is a method obtained by a known method, and examples thereof include a method of oxidizing and polymerizing 2,6-xylenol by using an amine complex of a cuprous salt as a catalyst, which is described in U.S. Pat. No. 3,306,784.

Component (A) may be the polyphenylene ether resin alone. However, a mixture of the polyphenylene ether resin and a polystyrene-based resin can more enhance the effect of the invention.

The polystyrene-based resin is preferably general-purpose polystyrene (GPPS) or a styrene-butadiene graft copolymer having styrene chains as graft chains, that is to say, high-impact polystyrene (HIPS). A mixture of GPPS and HIPS at any ratio may also be used. From the viewpoint of chemical resistance, it is preferred that the weight average molecular weight of the polystyrene-based resin is from 170,000 to 400,000, preferably from 200,000 to 350,000, and more preferably from 210,000 to 300,000. Further, the molecular weight distribution thereof is preferably from 1.5 to 3.5. In the case of HIPS, it is preferred that the weight average molecular weight and molecular weight distribution of a matrix extruding a dispersion phase is within the above-mentioned ranges.

When HIPS is used, it is preferred that the conjugate diene content is from 1 to 20% by weight, preferably from 3 to 15% by weight, and more preferably from 5 to 10% by weight. Further, in terms of inhibiting the growth of a crack in a molded article due to a chemical, it is preferred that the average dispersed particle size of the conjugate diene is from 0.5 to 3.0 μm, preferably from 0.7 to 2.5 μm, and more preferably from 1.0 to 2.0 μm. The average dispersed particle size of the conjugate diene can be obtained by the Coulter counter method under conditions of 100 mg/100 cc, the use of a THF solvent and 23° C. Further, from the viewpoint of heat stability, the 1,4-bond amount of the conjugate diene is preferably 90% or more, and the unsaturated bonds are preferably partially hydrogenated.

The amount of component (A) is from 70 to 98% by weight. When the polyphenylene ether resin is used in combination with the polystyrene-based resin, the composition of the mixture can be selected within any range depending on desired performance. From the viewpoints of injection moldability (flowability) and heat resistance, it is preferred that the ratio occupied by the polyphenylene ether resin in the above-mentioned mixture is from 20 to 60% by weight, and preferably from 30 to 50% by weight.

Component (B) is an aromatic vinyl-conjugate diene block copolymer in which a conjugate diene moiety is hydrogenated. Examples of the block copolymers include a butadiene-styrene block copolymer, a butadiene-isoprene block copolymer and the like, and a butadiene-styrene block copolymer is particularly preferred. The aromatic vinyl content of component (B) is from 50 to 80% by weight, preferably from 55 to 75% by weight, and more preferably from 60 to 70% by weight. The use of the block copolymer high in the aromatic vinyl content can enhance the compatibility of component (C) that improves chemical resistance with component (A), and inhibit layer separation which occurs in a thin-walled molded article (2 mm or less, particularly 0.5 mm or less), thereby being able to improve remarkably the surface appearance of the molded article. The bond structure of the conjugate diene moiety before hydrogenation is not particularly limited. Further, it is preferred that the degree of hydrogenation of the conjugate diene moiety is 20% or more, and preferably 50% or more, from the viewpoints of improvement in impact resistance and heat stability.

Component (C) is an aromatic vinyl-isoprene block copolymer in which an isoprene moiety is hydrogenated. The aromatic vinyl content of component (C) is from 15 to 45% by weight, and preferably from 15 to 30% by weight. The bond structures of isoprene blocks include a 1,2-bond, a 1,4-bond and a 3,4-bond. However, in terms of not decreasing rigidity so much, it is preferred that the total amount of 1,2- and 3,4-vinyl bonds is 35% or more, preferably 45% or more, and more preferably 50% or more. Compound (C) high in the total amount of 1,2- and 3,4-vinyl bonds causes large steric hindrance and is rigid at ordinary temperature, so that it is characterized by that the rigidity of a commercial product is not decreased so much, even when an elastomer is mixed therewith. It is therefore suitable for a commercial product requiring high rigidity. Further, the degree of hydrogenation of the isoprene block is preferably 80% or more from the viewpoint of chemical resistance.

The resin composition of the invention is characterized in that the above-mentioned component (B) and component(C) are used in combination with each other. Component (C) can improve the chemical resistance of the resin composition, and component (B) high in the aromatic vinyl content causes the compatibility of component (C) with component (A), thereby being able to inhibit layer separation which occurs in the thin-walled molded article to improve remarkably the surface appearance of the molded article. Further, brittleness in an extremely thin-walled portion (0.3 mm or less) can also be improved.

For component (B) and component (C), type 3 of A-B-A' is generally known. However, type A-B-A'-B' (type 4) and type A-B (type 2) provide an effect similar to the case of type 3, and can be used in the invention.

The amounts of component (B) and component (C) added are each from 1 to 15% by weight, preferably from 1.5 to 10% by weight, and more preferably from 2 to 7% by weight.

In the invention, chemical resistance can be more improved by blending component (D) (an α-olefin copolymer) and component (E) (a polyolefin resin).

Component (D) has the effect of further stabilizing the expression of chemical resistance. The α-olefin copolymers include an ethylene-propylene random or block copolymer (ethylene/propylene copolymer elastomer), an ethylene-(meth)acrylic acid or alkyl (meth)acrylate copolymer, an ethylene-1-polyoctene copolymer and the like. These may be used as a combination of two or more thereof. Above all, an ethylene-propylene copolymer, an ethylene-1-butene copolymer and an ethylene-1-octene copolymer are preferred. The amount of component (D) added is from 0.1 to 5 parts by weight, preferably from 0.3 to 3 parts by weight, and more preferably from 0.5 to 1.5 parts by weight, based on 100 parts by weight of the resin composition comprising the above-mentioned components (A), (B) and (C).

Component (E) has the effect of further improving chemical resistance. The polyolefin resins include high density polyethylene, low density polyethylene, linear low density polyethylene, isotactic polypropylene and the like. These may be used as a combination of two or more thereof. The amount of component (E) added is preferably from 5 to 25 parts by weight, based on 100 parts by weight of the resin composition comprising the above-mentioned components (A), (B) and (C) (and component (D) as needed).

Various additives such as a heat stabilizer and a coloring agent which are usually blended with a polyphenylene ether resin can be blended with the resin composition of the invention within the range not impairing the effect of the invention.

The resin composition of the invention is excellent in chemical resistance, heat resistance, rigidity and impact resistance. Further, even when the resin composition is molded into a thin-walled, article having a thickness of 2 mm or less, no separation occurs and the appearance of the molded article is also excellent. In particular, the resin composition is excellent in chemical resistance in respect to organic solvents (such as an organic acid ester) contained in skin lotion and the like, so that it can be suitably used for applications such as a washing toilet table, a sink and a housing of a disposable razor, which have many opportunities to come into contact with these chemicals.

The present invention will be illustrated in greater detail with reference to the following examples, but the invention should not be construed as being limited thereto.

Components Used in Examples (1) Polyphenylene Ethers

PPE-1: Poly(2,6-dimethyl-1,4-phenylene ether) having a reduced viscosity (measured at 30° C. at a concentration of 0.5 g/dl $CHCl_3$) of 0.53, weight average molecular weight: 51,000, molecular weight distribution: 2.1

PPE-2: Poly(2,6-dimethyl-1,4-phenylene ether) having a reduced viscosity of 0.43, weight average molecular weight: 36,000, molecular weight distribution: 2.1

(2) Polystyrene-Based Resins

HIPS: Rubber-reinforced polystyrene having a rubber (polybutadiene) particle size of 1.5 µm on average, a rubber content of 10% by weight, a 1,4-bond content of 92% and an MFR (ISO R1133, a load of 5 kg, 200° C.) of 2.7 g/10 min (weight average molecular weight of matrix: 170,000, molecular weight distribution: 2.2)

GPPS: Polystyrene having a Vicat softening temperature (ASTM-D1525) of 107° C. and an MFR of 2.0 g/10 min (weight average molecular weight of matrix: 280,000, molecular weight distribution: 2.2)

(3) Block Copolymers

Styrene-Butadiene Block Copolymers

HTR-1: An elastomer in which the molecular weight of a styrene moiety is 30,000 and the degree of hydrogenation of a butadiene block is 99.6%, and a type 3 block copolymer in which the amount of styrene bonded is 67% by weight HTR-2: An elastomer in which the molecular weight of a styrene moiety is 20,000 and the degree of hydrogenation of a butadiene block is 99.4%, and a type 3 block copolymer in which the amount of styrene bonded is 29% by weight Styrene-Isoprene Block Copolymers HTR-3: An elastomer in which the molecular weight of a styrene moiety is 16,000 and the degree of hydrogenation of an isoprene block is 80%, and a type 3 block copolymer in which the amount of styrene bonded is 20% by weight and the total amount of 1,2- and 3,4-vinyl bonds of isoprene before hydrogenation is 55%

HTR-4: An elastomer in which the molecular weight of a styrene moiety is 38,000 and the degree of hydrogenation of an isoprene block is 83%, and a type 3 block copolymer in which the amount of styrene bonded is 47% by weight and the total amount of 1,2- and 3,4-vinyl bonds of isoprene before hydrogenation is 8%

(4) α-Olefinic Copolymer

Tafmer P60-J manufactured by Mitsui Chemicals, Inc. (ethylene-propylene random copolymer, specific gravity: 0.87/23° C., MFR: 0.7)

(5) Polyolefin

Suntec LD M1804 manufactured by Asahi Kasei Corporation (specific density: 0.919 (JIS K7112), MFR: 0.4 g/10 min (JIS K7210 (190° C.)), tensile breaking strength: 20 MPa (JIS Z1702))

Evaluation Methods (1) Peeling Test

A 0.16-mm-molded test piece was prepared at a rein temperature of 280° C. using an injection molding machine, and judgment was made by the appearance thereof and a repeating bending test by hand.

(2) MFR

The MFR was measured by the method described in ASTM-D-1238 under conditions of a load of 10 kg and a temperature of 250° C.

(3) Heat Deformation Temperature (HDT)

The HDT was measured by the method described in ASTM-D-648 using a test piece having a thickness of 6.32 mm at a rate of temperature increase of 2° C. per minute under a shear plane load of 18.2 MPa.

(4) Izod Impact Test

The Izod impact value was measured by the method described in ASTM-D-256 using a test piece having a test piece thickness of 6.32 mm.

(5) Flexural Modulus (FM)

The FM was measured by the method described in ASTM-D-790.

(6) Bending Test

The resin composition was molded at a resin temperature of 280° C. to prepare a molded article having a thickness of 0.1 mm, a width of 1.25 mm and a length of 12.5 mm, and a repeating bending test was performed by hand to evaluate brittleness. For evaluation criteria, one which could withstand 5 or more bending times was taken as "good", and one less than that was taken as "unacceptable".

(7) Chemical Resistance

As the organic solvents, there were used isopropyl myristate, isopropyl palmitate, monostearic acid glyceride, ethyl benzoate and diethyl phthalate (all are reagent chemicals manufactured by Wako Pure Chemical Industries, Ltd.). Monostearic acid glyceride, ethyl benzoate and diethyl phthalate were each diluted with n-butanol to use as a 30-wt % solution. As palm oil, MCT Oil (trade name) manufactured by Miyoshi Oil & Fat Co., Ltd. was used for studies.

As a test piece for evaluating chemical resistance, a tensile test piece of ASTM was attached to a test jig made of stainless steel, which was curved so that a strain of 0.5% is applied to a surface of the test piece. The strain amount E is indicated by the following equation:

$$\text{Strain amount } \epsilon = t/(2R+t)$$

R: the curvature radius of the test jig, t: the thickness of the test piece)

A gauze was placed on the surface of the tensile test piece attached to the test jig, and various solvents were dropped thereon, followed by standing. A contact surface between the gauze and the test piece was visually observed, and the time taken until a crack (craze) occurred on the surface was taken as the index of chemical resistance. When the time was 7 days or more, it was taken as "acceptable (fit for practical use)".

(8) Evaluation of Surface Appearance

For a flat plate of 90×55×0.5 mm (thickness), the state of a surface (the presence or absence of silver streaks and flow marks) and the gloss were evaluated.

EXAMPLES

Respective components were melt kneaded using a double-screw extruder (ZSK25 (L/D=46) manufactured by Werner & Pfleiderer) to obtain a resin composition. PPE and GPPS were supplied from a hopper of the extruder, and block copolymers and HIPS were added from a side feed opening provided at a position of L/D=15 or more. The temperature was set to 280° C., and the discharge rate was set to 15 to 25 kg. The evaluation results of resin compositions obtained are shown in Table 1 and Table 2.

TABLE 1(1)

|     |     | Example 1 | Example 2 | Example 3 | Example 4 | Example 5 |
| --- | --- | --- | --- | --- | --- | --- |
| (A) | PPE-1 | 9.75 | 9.75 | 9.75 | 9.75 | 9.75 |
|     | PPE-2 | 29.03 | 29.03 | 29.03 | 29.03 | 29.03 |
|     | HIPS | 12.02 | 11.77 | 19.27 | 22.3 | 22.3 |
|     | GPPS | 33.2 | 32.85 | 25.35 | 24.32 | 24.32 |
| (B) | HTR-1 | 5 | 5 | 2 | 4 | 10 |
|     | HTR-2 |  |  |  |  |  |
| (C) | HTR-3 | 11 | 11 | 14 | 10 | 4 |
|     | HTR-4 |  |  |  |  |  |
| (D) | α-Olefinic Copolymer |  | 0.6 | 0.6 | 0.6 | 0.6 |
| (E) | Polyolefin |  |  |  |  |  |
|     | State of Separation | Good | Good | Good | Good | Good |
|     | MFR [g/10 min] | 13 | 12.4 | 11.8 | 9.5 | 9.5 |
|     | HDT 18.3 MPa ° C. | 120 | 121 | 121 | 119 | 119 |
|     | IZOD [J/m] | 180 | 183 | 180 | 252 | 252 |
|     | FM [MPa] | 2350 | 2350 | 2350 | 2400 | 2160 |
|     | Bending Test | Good | Good | Good | Good | Good |

TABLE 1(1)-continued

|  | Example 1 | Example 2 | Example 3 | Example 4 | Example 5 |
|---|---|---|---|---|---|
| Surface Appearance |  |  |  |  |  |
| Silver Streaks, Flow Marks | Good | Good | Good | Good | Good |
| Gloss | Good | Good | Good | Good | Good |
| Chemical Resistance |  |  |  |  |  |
| Ethyl Myristate | 10 to 15 days | ≧15 days | ≧15 days | ≧15 days | ≧15 days |
| Isopropyl Palmitate | ≧15 days | ≧15 days | ≧15 days | ≧15 days | ≧15 days |
| Monostearic Acid Glyceride | ≧15 days | ≧15 days | ≧15 days | ≧15 days | ≧15 days |
| Ethyl Benzoate | 8 to 10 days | 10 to 13 days | 10 to 12 days | 10 to 15 days | 9 to 15 days |
| Diethyl Phthalate | 9 to 12 days | 10 to 15 days | 10 to 15 days | 10 to 15 days | 7 to 15 days |
| Palm Oil | 10 to 15 days | ≧15 days | ≧15 days | ≧15 days | 10 to 15 days |
| Judgment | Good | Good | Good | Good | Good |

TABLE 1(2)

|  |  | Example 6 | Example 7 | Example 8 | Example 9 | Example 10 | Example 11 |
|---|---|---|---|---|---|---|---|
| (A) | PPE-1 | 9.75 | 9.8 | 9.8 | 9.8 | 9.8 | 9.75 |
|  | PPE-2 | 29.03 | 29.3 | 29.3 | 29 | 29 | 29.03 |
|  | HIPS | 22.3 | 12.2 | 12.2 | 22 | 22 | 22.6 |
|  | GPPS | 24.32 | 32.9 | 34.7 | 23.3 | 23.3 | 24.62 |
| (B) | HTR-1 | 6 | 3 | 2 | 2.5 | 5.8 | 2.4 |
|  | HTR-2 |  |  |  |  |  |  |
| (C) | HTR-3 | 2 | 7.1 | 6 | 5.8 | 2.5 | 5.6 |
|  | HTR-4 |  |  |  |  |  |  |
| (D) | α-Olefinic Copolymer | 0.6 | 0.6 | 0.6 | 0.6 | 0.6 |  |
| (E) | Polyolefin | 6 | 5.1 | 5.1 | 7 | 7 | 6 |
|  | State of Separation | Good | Good | Good | Good | Good | Good |
|  | MFR [g/10 min] | 10.3 | 12.4 | 12.5 | 9.5 | 11 | 9.5 |
|  | HDT 18.3 MPa ° C. | 122 | 121 | 122 | 122 | 119 | 119 |
|  | IZOD [J/m] | 148 | 130 | 125 | 251 | 205 | 252 |
|  | FM [MPa] | 2580 | 2300 | 2350 | 2180 | 2520 | 2360 |
|  | Bending Test | Good | Good | Good | Good | Good | Good |
|  | Surface Appearance |  |  |  |  |  |  |
|  | Silver Streaks, Flow Marks | Good | Good | Good | Good | Good | Good |
|  | Gloss | Good | Good | Good | Good | Good | Good |
|  | Chemical Resistance |  |  |  |  |  |  |
|  | Ethyl Myristate | ≧15 days | ≧15 days | ≧15 days | ≧15 days | ≧15 days | ≧15 days |
|  | Isopropyl Palmitate | ≧15 days | ≧15 days | ≧15 days | ≧15 days | ≧15 days | ≧15 days |
|  | Monostearic Acid Glyceride | ≧15 days | ≧15 days | ≧15 days | ≧15 days | ≧15 days | ≧15 days |
|  | Ethyl Benzoate | ≧15 days | ≧15 days | ≧15 days | ≧15 days | ≧15 days | ≧15 days |
|  | Diethyl Phthalate | 7 to 15 days | 13 to 15 days | 14 to 15 days | ≧15 days | 13 to 15 days | ≧15 days |
|  | Palm Oil | 10 to 15 days | ≧15 days | ≧15 days | ≧15 days | ≧15 days | ≧15 days |
|  | Judgment | Good | Good | Good | Good | Good | Good |

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| (A) | PPE-1 | 9.75 | 9.75 | 9.75 | 9.75 | 9.75 | 9.75 | 9.75 |
|  | PPE-2 | 29.03 | 29.03 | 29.03 | 29.03 | 29.03 | 29.03 | 29.03 |
|  | HIPS | 12.02 | 11.27 | 19.27 | 22.77 | 19.5 | 19.5 | 19.5 |
|  | GPPS | 33.2 | 33.35 | 25.35 | 23.85 | 25.12 | 25.12 | 25.12 |
| (B) | HTR-1 | 5 | 5 | 14 | 6 | 10 |  | 2 |
|  | HTR-2 |  |  |  | 2 |  | 10 | 8 |
| (C) | HTR-3 |  |  |  |  |  |  |  |
|  | HTR-4 | 11 | 11 | 2 |  |  |  |  |
| (D) | α-Olefinic Copolymer |  | 0.6 | 0.6 | 0.6 | 0.6 | 0.6 | 0.6 |
| (E) | Polyolefin |  |  |  | 6 | 6 | 6 | 6 |
|  | State of Separation | Good | Good | Good | Good | Good | Separation | Good |
|  | MFR [g/10 min] | 9.5 | 9.1 | 8.9 | 9.4 | 11.7 | — | 8.9 |
|  | HDT 18.3 MPa ° C. | 121 | 121 | 120 | 122 | 120 | — | 117 |
|  | IZOD [J/m] | 134 | 132 | 23.3 | 134 | 224 | — | 145 |
|  | FM [MPa] | 2340 | 2340 | 2200 | 2320 | 2330 | — | 2100 |
|  | Bending Test | Unacceptable | Unacceptable | Unacceptable | Unacceptable | Unacceptable | Unacceptable | Unacceptable |
|  | Surface Appearance |  |  |  |  |  |  |  |
|  | Silver Streaks, Flow Marks | Poor | Poor | Poor | Poor | Poor | Poor | Poor |
|  | Gloss | Poor | Poor | Poor | Poor | Poor | Poor | Poor |

TABLE 2-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- |
| Chemical Resistance | | | | | | | |
| Ethyl Myristate | ≧15 days | ≧15 days | ≧15 days | 1 to 3 days | 1 to 3 days | — | 2 to 4 days |
| Isopropyl Palmitate | ≧15 days | ≧15 days | ≧15 days | 1 to 8 days | 1 to 3 days | — | 2 to 3 days |
| Monostearic Acid Glyceride | ≧15 days | ≧15 days | ≧15 days | ≧15 days | 5 to 7 days | — | ≧15 days |
| Ethyl Benzoate | <12 hours | <12 hours | <12 hours | <12 hours | <1 hour | — | <1 hour |
| Diethyl Phthalate | <12 hours | <12 hours | <12 hours | <12 hours | <1 hour | — | <1 hour |
| Palm Oil | <12 hours | <12 hours | <12 hours | <12 hours | <1 hour | — | <1 hour |
| Judgment | Unacceptable | Unacceptable | Unacceptable | Unacceptable | Unacceptable | Unacceptable | Unacceptable |

Chemical Resistance

In Examples 1 to 5 and Comparative Examples 1 to 3, differences in various characteristics due to the structure of component (C) were examined. Comparisons between Example 1 and Comparative Example 1, and between Example 2 and Comparative Example 2 prove that the resin compositions in which the styrene content of component (C) is within the range specified in the invention are excellent in chemical resistance (such as ester resistance or oil and fat resistance).

In Examples 6 to 11 and Comparative Examples 4 to 7, differences in various characteristics due to the structure of component (C) at the time when polyolefin resin (E) was added were examined. Blending of the polyolefin resin can further improve chemical-resistance. As shown in Comparative Examples 4 to 7 when component (C) is not blended, even blending of the polyolefin resin does not improve chemical resistance.

Thin Wall Molding

It is revealed that the use of HTR-1 much in styrene content in combination with HTR-3 having 1,2- and 3,4-vinyl bonds remarkably improves the surface appearance and bending resistance of the thin-walled molded articles.

While the invention has been described in detail with reference to particular embodiments, it is obvious to those skilled in the art that various changes and modifications may be made without departing from the spirit and scope of the invention.

This application is based on Japanese Patent Application No. 2002-212571 filed on Jul. 22, 2002, the contents of which are incorporated herein by reference.

INDUSTRIAL APPLICABILITY

According to the resin molded article of the invention, there can be provided a PPE resin composition which is strong to organic acid esters contained in skin lotion and the like, generates no separation to show good surface appearance, does not become brittle even when exposed to a high shear rate at the time of molding processing, and is excellent in heat resistance and impact resistance. Further, from the characteristics thereof, the application range is suitable for a washing toilet table, a sink and a housing of a disposable razor

The invention claimed is:

1. A resin composition comprising (A) 70 to 98% by weight of a polyphenylene ether resin or a mixture of a polyphenylene ether resin and a polystyrene-based resin, (B) 1 to 15% by weight of a hydrogenated product of an aromatic vinyl butadiene block copolymer having an aromatic vinyl content of 50 to 80% by weight, and (C) 1 to 15% by weight of a hydrogenated product of an aromatic vinyl-isoprene block copolymer having an aromatic vinyl content of 15 to 45% by weight, wherein isoprene blocks in the aromatic vinyl-isoprene block copolymer (C) have a total amount of 1,2- and 3,4-vinyl bonds of 35% or more and wherein vinyl content is determined before hydrogenation.

2. The resin composition according to claim 1, wherein the polyphenylene ether resin has a weight-average molecular weight of from 8,000 to 80,000 and a molecular weight distribution of from 2.0 to 3.0.

3. The resin composition according to claim 1, wherein component (A) is a mixture of a polyphenylene ether resin and a polystyrene-based resin.

4. The resin composition according to claim 3, wherein the polystyrene-based resin is a resin comprising a conjugate diene polymer or a conjugate diene-aromatic vinyl block copolymer, having grafted thereto an aromatic vinyl chain, wherein the content of the conjugate diene is from 1 to 20% by weight, and the average dispersed particle size is from 0.5 to 3.0 micrometers.

5. The resin composition according to claim 4, wherein the conjugate diene has a 1,4-bond amount of 90% or more.

6. The resin composition according to claim 3, wherein the polystyrene-based resin has a weight-average molecular weight of from 170,000 to 400,000, and a molecular weight distribution of from 1.5 to 3.5.

7. The resin composition according to claim 1, wherein the aromatic vinyl-butadiene block copolymer (B) has a hydrogenation degree of 20% or more.

8. The resin composition according to claim 1, wherein the aromatic vinyl-butadiene block copolymer (B) has a hydrogenation degree of 50% or more.

9. The resin composition according to claim 1, wherein the aromatic vinyl-isoprene block copolymer (C) has a hydrogenation degree of 80% or more.

10. The resin composition according to claim 1, wherein isoprene blocks in the aromatic vinyl-isoprene block copolymer (C) have a total amount of 1,2- and 3,4-vinyl bonds of 45% or more.

11. The resin composition according to claim 1, wherein isoprene blocks in the aromatic vinyl-isoprene block copolymer (C) have a total amount of 1,2- and 3,4-vinyl bonds of 50% or more.

12. A resin composition comprising 100 parts by weight of the resin composition according to claim 1 and (D) 0.1 to 5 parts by weight of an α-olefinic copolymer.

13. A resin composition comprising 100 parts by weight of the resin composition according to claim 1 and (E) 5 to 25 parts by weight of a polyolefin resin.

14. The resin composition according to claim 1, further comprising a heat stabilizer or a coloring pigment.

15. A molded article comprising the resin composition according to claim 1 and having a site with a thickness of 2 mm or less.

16. The molded article according to claim 15, which is to be used for a site which comes into contact with an organic acid ester.

17. The resin composition according to claim 1, wherein the aromatic vinyl-butadiene block copolymer (B) has an aromatic vinyl content of from 60 to 70% by weight.

18. The resin composition according to claim 1, wherein the aromatic vinyl-butadiene block copolymer (B) is a styrene-butadiene block copolymer.

* * * * *